United States Patent [19]

Sugimoto

[11] Patent Number: 5,802,405
[45] Date of Patent: Sep. 1, 1998

[54] CAMERA APPARATUS THAT CAN HAVE THE TIME FOR MOVING REAR LENS GROUP REDUCED WHEN POWERED

[75] Inventor: Kazuhiko Sugimoto, Osaka, Japan

[73] Assignee: Sanyo Electric Co., Ltd., Osaka, Japan

[21] Appl. No.: 835,354

[22] Filed: Apr. 7, 1997

Related U.S. Application Data

[63] Continuation of Ser. No. 448,261, May 23, 1995, abandoned.

[30] Foreign Application Priority Data

Jun. 1, 1994 [JP] Japan ................................ 6-120251

[51] Int. Cl.$^6$ ............................ G03B 3/10; G03B 3/00; G03B 7/00
[52] U.S. Cl. ................................ 396/82; 396/81; 396/87; 396/129
[58] Field of Search ............................ 396/77–82, 85–87, 396/129, 130, 133

[56] References Cited

U.S. PATENT DOCUMENTS

| | | | |
|---|---|---|---|
| 4,743,931 | 5/1988 | Matsuzaki et al. | 354/400 |
| 4,748,509 | 5/1988 | Otake et al. | 354/400 |
| 4,885,600 | 12/1989 | Iwase et al. | 354/195.12 |
| 5,146,071 | 9/1992 | Ookubu et al. | 354/402 |
| 5,179,407 | 1/1993 | Kusaka et al. | 354/400 |
| 5,280,317 | 1/1994 | Haraguchi et al. | 354/195.1 |
| 5,281,796 | 1/1994 | Kaneda et al. | 354/402 |
| 5,302,991 | 4/1994 | Nakayama | 354/195.12 |
| 5,305,049 | 4/1994 | Miyazaki et al. | 354/195.12 |
| 5,363,164 | 11/1994 | Kobayashi et al. | 354/195.1 |
| 5,448,413 | 9/1995 | Kobayashi et al. | 354/402 |

FOREIGN PATENT DOCUMENTS

| | | |
|---|---|---|
| 394901 | 10/1990 | European Pat. Off. . |
| 3-119872 | 5/1991 | Japan . |
| 31-119872 | 5/1991 | Japan . |
| 41-84407 | 7/1992 | Japan . |
| 42-04705 | 7/1992 | Japan . |
| 42-19710 | 8/1992 | Japan . |
| 42-56911 | 9/1992 | Japan . |

*Primary Examiner*—Safet Metjahic
*Assistant Examiner*—Michael Dalakis
*Attorney, Agent, or Firm*—Armstrong, Westerman, Hattori, McLeland & Naughton

[57] ABSTRACT

The position of a rear lens group at the time power is turned off is stored in a memory as a relative value on the basis of the positions of the rear lens group focusing on a subject at a near point and at an infinity point, respectively, with respect to the position of a zoom lens group at power off. When power is turned on, the rear lens group is moved to the reference position by a pulse motor, and the position of the zoom lens group is detected by an encoder. After the position detection operation, the rear lens group is moved to a position calculated according to the current position of the zoom lens group and the relative value stored in the memory.

20 Claims, 5 Drawing Sheets

CAMERA APPARATUS THAT CAN HAVE THE TIME FOR MOVING REAR LENS GROUP REDUCED WHEN POWERED

This application is a continuation of application Ser. No. 08/448,261 filed May 23, 1995, now abandoned.

BACKGROUND OF THE INVENTION

1. Field of the Invention

The present invention relates to a camera apparatus employing a lens unit of a rear lens focus system for carrying out a focusing operation by moving a rear lens group.

2. Description of the Background Art

In a camera apparatus, an autofocus device serves to control automatically the movement of lens for focusing according to the distance to a subject or an in-focus state that is electrically detected.

Focus adjustment is generally divided into a method of driving a group of front lens or a group of rear lens as the focus lens. The former method of driving the front lens group has the disadvantage that the structure for driving the lens is increased in size. During the past several years, a camera apparatus for consumer use, particularly a video camera, employs the method of driving the rear lens group in which a drive structure can be constructed rather easily and that has lower power consumption.

A driving system formed of a reference position sensor and a pulse motor for driving a lens is provided for the group rear lens. The pulse motor is controlled according to an electric signal detecting the distance or a focal point. The pulse motor is rotated at an angle proportional to the number of applied pulses. The rear lens group moves backwards and forwards along the optical axis in response to the rotation of the pulse motor.

The above description is based on an operation when the power of the camera apparatus is on. The rear lens group is controlled so as to return to the reference position when the power of a camera apparatus is turned on from the position it is left when the power was turned off in order to carry out the position detection of the rear lens group at high accuracy. Then, the rear lens group moves to its focal position according to an electric signal corresponding to the distance to be shooted or the focal point.

In order to reduce the time period starting from initialization of the position of the rear lens group at the time power is turned on up to its travel to the focal position, Japanese Patent Laying-Open No. 3-119872 proposes a method of returning the rear lens group to the position taken when the power was last turned off after its initialization of the position of the rear lens group when power is turned on.

Figure 4:
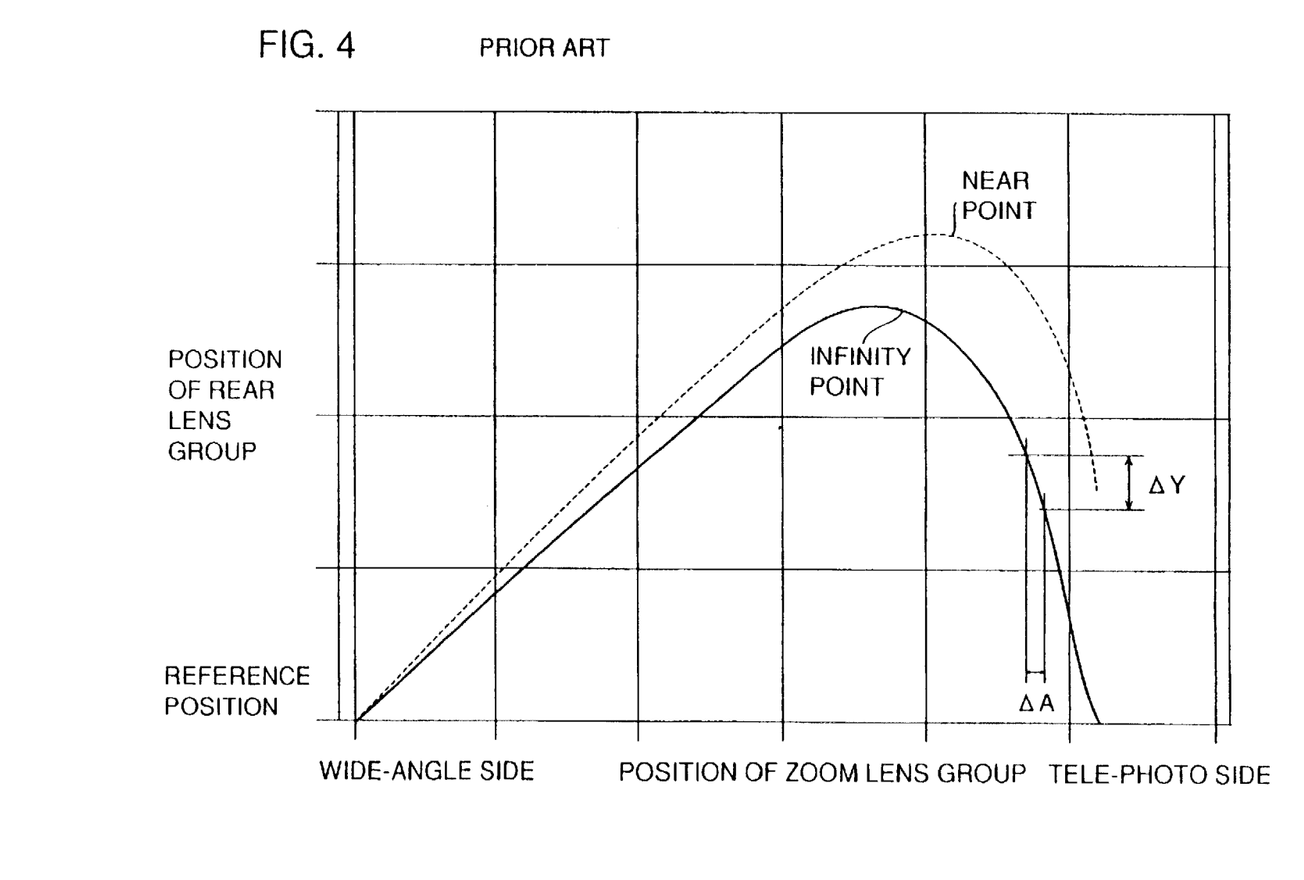
FIGS. 4 and 5 are diagrams for showing the position relationship of a group of zoom lens and a group of rear lens.

FIG. 4 shows the relationship between the position of the zoom lens group and rear lens group when the distance to a subject is at an infinity point (solid line) and a near point (dotted line). The position of the zoom lens group is plotted along the abscissa, and the position of the rear lens group is plotted along the ordinate.

Although the method disclosed in the above publication allows the rear lens group to be quickly returned to the former position taken when the power is turned off, a situation must be considered in which the position of the zoom lens group is shifted by $\Delta A$ as shown in FIG. 4 due to some external cause such as vibration before the power is turned on again. In such a case, there will be an offset of $\Delta Y$ between the position of the rear lens group at the time of power off and the position of the rear lens group when the power is subsequently turned on focusing on the subject at the time of power off. More specifically, in the case where the position of the zoom lens group is shifted due to an external cause such as vibration during a powered down period, the rear lens group will be out of focus with respect to the subject that was in-focus at its previous cut down of power even when the rear lens group is restored to the former position taken when the power was turned off. The rear lens group will move to the focal position thereafter if an autofocus device can be operated. However, in the case of a manual focus made where the focal position is locked, the subject in focus when the power was turned off will be kept in a state out of focus regardless of the need of focusing accuracy.

As shown in FIG. 4, when the zoom lens group is located at the wide-angle side, the difference in position of the rear lens group between the infinity point and the near point is very small. There is a possibility of great defocus even when the position of the zoom lens group is not shifted by an external cause, as set forth in the following. When power is turned off after a subject is brought in focus at the tele-photo side in a manual focus mode and then zoomed to the wide-angle side, the position of the rear lens group will be restored to the former position. However, since the information of how far the subject is located when in focus, i.e. the distance from the subject, is not maintained, there is a possibility of great defocus when the zoom lens is shifted towards the tele-photo side. This will be described in detail hereinafter. In a rear focus lens unit employed in a video camera for consumer use, the difference in position of the rear lens group from the infinity point to the near point at the wide-angle end side is approximately 30 μm, and the travel distance of each step of a pulse motor driving the rear lens group is approximately 10 μm. This means that distance information in the steps of only 0, 10, 20, 30 μm can be obtained at the wide-angle end side. There is a possibility that the subject is greatly out of focus towards the tele-photo side since the position of the rear lens group is adjusted on the basis of the distance from the current subject at the time of zooming.

SUMMARY OF THE INVENTION

An object of the present invention is to reduce the time required starting from initialization of the position of a group of rear lens until the rear lens group is transferred again to its focal position at the time of power on even when the position of the zoom lens group is shifted due to an external cause such as vibration in a camera apparatus employing a lens unit of a rear focus system carrying out a focusing operation by moving the rear lens group.

A camera apparatus according to an aspect of the present invention includes a rear focus system lens unit having a zoom lens group and a rear lens group for obtaining focus by moving the rear lens group. The camera apparatus includes a memory, first and second transfer units, and a position detection unit. The memory stores a relative value as the position of the rear lens group at the time power was turned off on the basis of the position of the rear lens group focusing on a subject at a near point and the position of the rear lens group focusing on a subject at an infinity point with respect to the zoom lens group located at a position identical to the previous position when power was turned off. The first transfer unit moves the rear lens group to a reference position when power is turned on. The position detection unit detects the position of the zoom lens group after the rear lens group is moved by the first transfer unit. The second transfer unit moves the rear lens group to a position calculated on the basis of the position of the zoom lens group detected by the position detection unit and the relative values stored in the memory.

In a rear focus system lens unit that carries out a focusing operation by moving a rear lens group, the relative value indicating the position of the rear lens group on the basis of the position of the rear lens group focusing on a subject at a near point and a subject at an infinity point is constant as long as the distance from the subject is constant regardless of the position of the zoom lens group shown in FIG. 10.

According to the above-described operation, the rear lens group moved to the reference position when power is turned on is transferred to a position calculated on the basis of the relative value indicating the position of the rear lens group stored at the time power was turned off and the position of the zoom lens group when the power is turned on.

Therefore, the time starting from initialization of the position of the rear lens group when power is turned on up to its transfer to a focal position can be reduced even when the position of the zoom lens has changed by vibration or the like when the power is off. Furthermore, defocus will not be encountered even when power is turned off after a group of zoom lens located at the tele-photo side and obtaining in-focus of a subject in a manual focus mode is moved to the wide-angle side, and then moved again to the tele-photo side at the next time power is turned on.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings.

Figure 1:
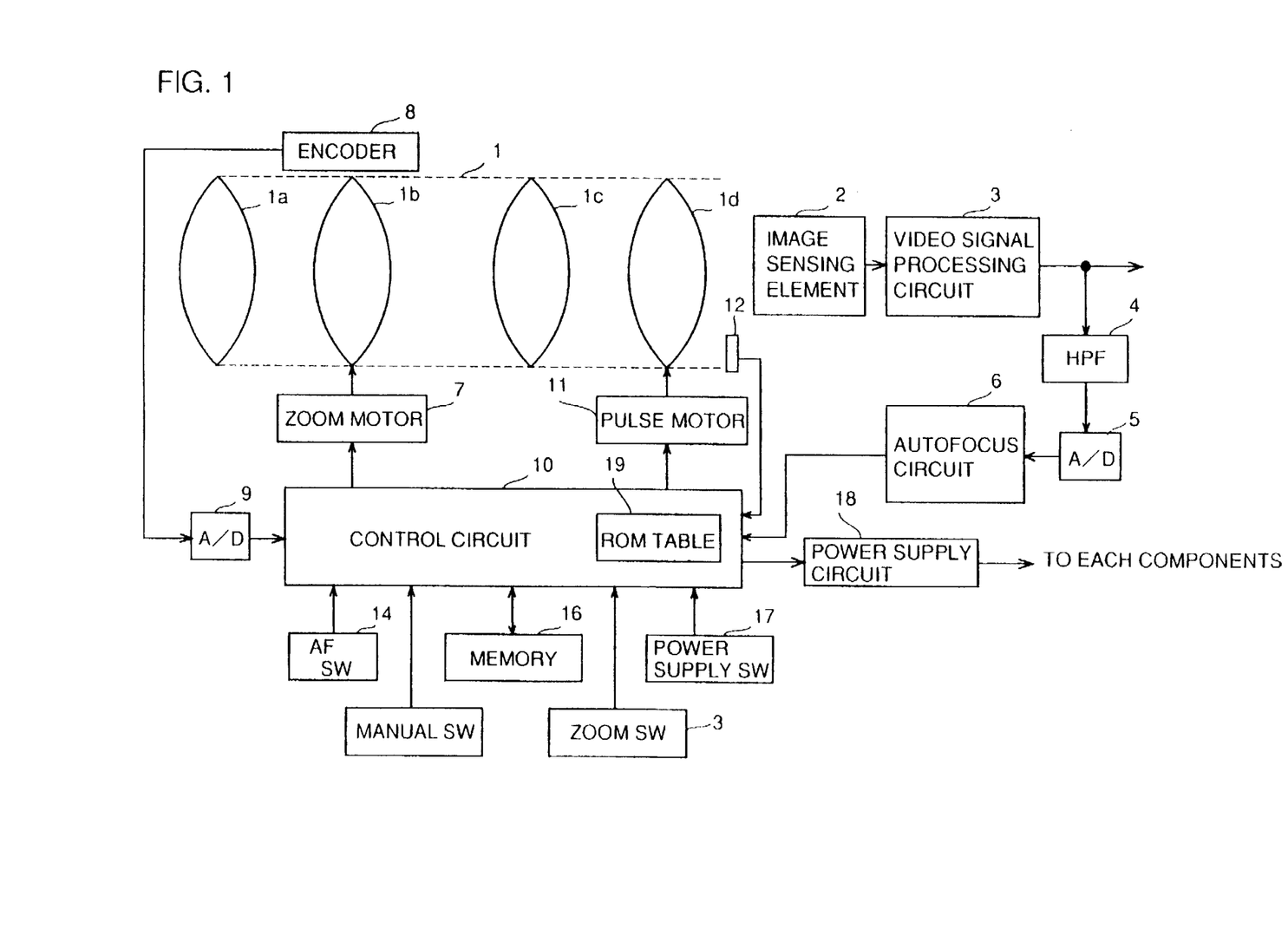
FIG. 1 is a functional block diagram showing first and second embodiments of the present invention.

FIG. 1 is a functional block diagram showing the structure of a video camera according to first and second embodiments of the present invention. Referring to FIG. 1, the video camera includes a lens unit 1 of a type that achieves focusing by moving a rear lens group. Lens unit 1 is formed of a front lens group 1a, a zoom lens group 1b effecting variable magnification, an elector lens group 1c, and a rear lens group 1d effecting a focusing operation. The light from a subject (not shown) passing through lens unit 1 is gathered on an image sensing plane of an image sensing element 2 to be converted into an electric signal. A video signal processing circuit 3 converts the electric signal into a video signal of an NTSC system or a PAL system. The high frequency range component of that output signal is converted into a digital signal by a high pass filter 4 and an analog/digital converter 5 to be applied to an autofocus circuit 6 as a focus evaluation value of hill-climbing autofocus.

Zoom lens group 1b is driven by a zoom motor 7. The position of zoom lens group 1b is detected by an encoder 8 formed of a slide volume. The output of encoder 8 is converted into a digital signal by an analog/digital converter 9 to be applied to a control circuit 10 controlling the video camera. Rear lens group 1d is driven by a pulse motor 11. A reference position is set by a reference position sensor 12. Reference position sensor 12 outputs a detection signal when rear lens group 1d is located at the reference position to control circuit 10.

Control circuit 10 receives a focus information signal from autofocus circuit 6 to control zoom motor 7 and pulse motor 11. A zoom switch 13, a focus mode switch 14 and a manual focus switch 15 are connected to control circuit 10. Zoom motor 7 is driven in response to the operation of zoom switch 13. In an autofocus mode, rear lens group 1d is moved so that the focus evaluation value is maximum according to a focus information signal from autofocus circuit 6. In a manual focus mode, rear lens group 1d is moved according to the operation of manual focus switch 15. Since pulse motor 11 rotates in proportion to the number of the input drive pulses, control circuit 10 identifies the position of rear lens 1d according to an output of reference position sensor 12 and the number of drive pulses to pulse motor 11. A nonvolatile memory 16 for storing the distance information and the position of zoom lens group 1b and a power supply switch 17 are connected to control circuit 10. Furthermore, a power supply circuit 18 that supplies power to each component of the video camera is controlled by control circuit 10.

An ROM table 19 is provided in control circuit 10. ROM table 19 stores data relating to the positions of rear lens group 1d focusing on a subject at a near point and at an infinity point with respect to various positions of zoom lens group 1b from the wide-angle side to the tele-photo side shown in FIG. 5.

Figure 2:
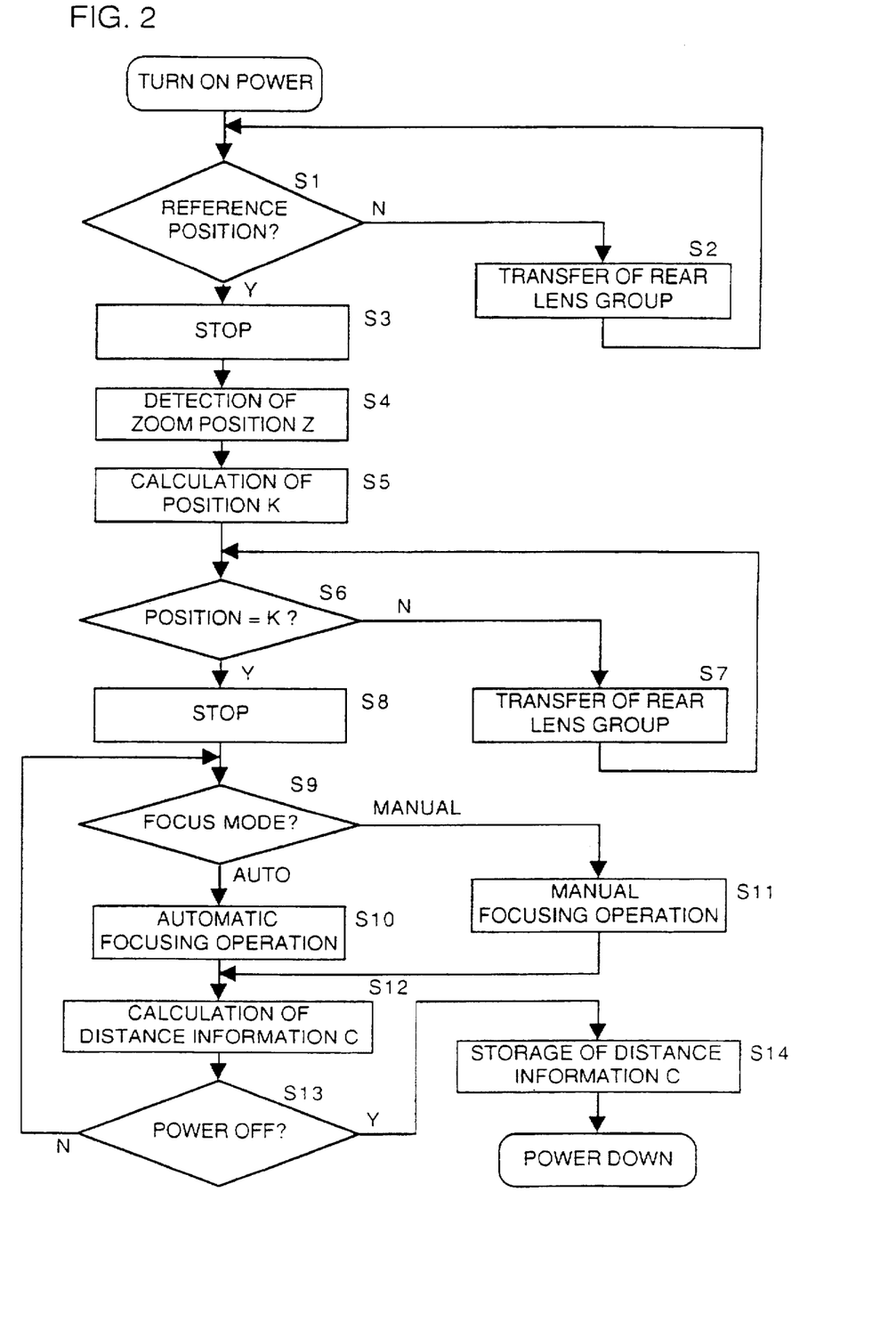
FIGS. 2 and 3 are flow charts showing the operation of the first and second embodiments, respectively, of the present invention.

The operation of the video camera of FIG. 1 according to a first embodiment will be described with reference to the flow chart of FIG. 2.

When power supply switch 17 is turned on, and power is supplied to each component of the video camera by power supply circuit 18, reference position sensor 12 detects whether rear lens group 1d is located at the reference position specified by reference position sensor 12 (S1). Rear lens group 1d is moved towards the reference position by pulse motor 11 if not at the reference position (S2), and placed at the reference position (S3). The current position Z of zoom lens group 1b is detected by encoder 8 (S4). Then, the position K of rear lens group 1d focusing on a subject at the time power is turned off is calculated (S5) using an equation that will be described afterwards with respect to the detected position Z of zoom lens group 1b with a and b as the positions of rear lens group 1d focusing on a subject at a near point and an infinity point, respectively, on the basis of the above-described reference position, and C as the distance information stored in advance in memory 16 (details described afterwards). Rear lens group 1d is moved towards position K by pulse motor 11. Pulse motor 11 is stopped when rear lens 1d arrives at position K (S6, S7 and S8).

Calculation of distance information C and position K of rear lens group 1d will be described hereinafter.

In a lens unit of a rear focus system that achieves focusing by moving the rear lens group, the ratio of a distance Y between a position A of rear lens group 1d focusing on a subject at a near point and a position B of rear lens group 1d focusing on a subject at an infinity point to a distance Y' between the actual position P of rear lens group 1d and position B of rear lens group 1d focusing on a subject at an infinity point, i.e. the relative value indicating the position of rear lens group 1d, is constant as long the distance from the subject is constant regardless of the position of the zoom lens group as shown in FIG. 1. This relative value is distance information C. Therefore, distance information C is calculated by the following equation (1).

Figure 5:
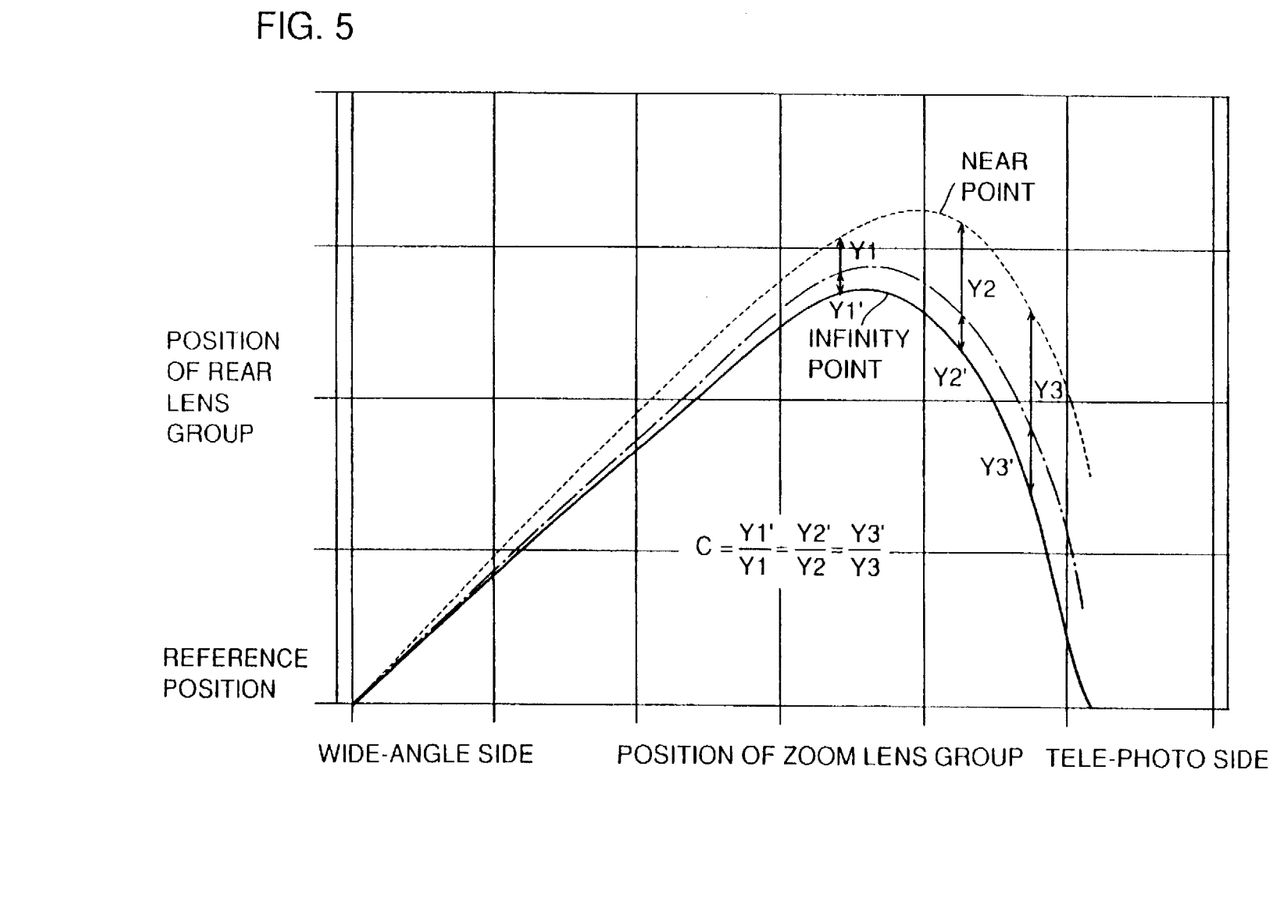

FIG. 5 shows that the distance Y can take such value as Y1, Y2 or Y3 depending on the position of the zoom lens group, while the distance Y' can take such value as Y1', Y2' or Y3' correspondingly, though the ration of both distances is always constant.

$$C = Y'/Y = (P-B)/(A-B) \quad (1)$$

Therefore, the position K of rear lens group 1d obtained in step S5 is calculated by the following equation (2) on the basis of positions a and b of rear lens group 1d stored in ROM table 19 beforehand and distance information C stored in memory 16 by a step S14 that will be described afterwards.

$$K = C \times (a-b) + b \quad (2)$$

The process succeeding step S8 of FIG. 2 will be described hereinafter. When the transfer of rear lens group 1d stops at step S8, the control proceeds to S9 to identify whether focus mode switch 14 is set to an autofocus mode or a manual focus mode. When an autofocus mode is set, pulse motor 11 is controlled to carry out an autofocus operation according to a focus information signal from autofocus circuit 6 (S10). When in a manual focus mode, pulse motor 11 is controlled according to the operation of manual focus switch 15, whereby rear lens group 1d is moved backwards or forwards along the optical axis direction to carry out a manual focusing operation (S11). Then, distance information C is calculated using equation (1) according to the current position of zoom lens group 1b and the position of rear lens group 1d (S12). In the focusing operations of steps S10 and S11 distance information C is used to control the rear lens group movement while maintaining the relationship of the positions of the zoom lens group and the rear lens group shown in FIGS. 4 and 5 in response to the movement of zoom lens group 1b by the operation of zoom switch 13.

When power supply switch 17 is operated to specify "OFF" of the power (S13), distance information C is stored in memory 16 (S14), and supply of power to each component by power supply circuit 18 is cut. Thus, the series of process is completed. The stored contents in memory 16 will not be lost even when power is turned off since memory 16 is nonvolatile. If "OFF" is not specified at step S13, the control returns to step S9 to repeat a process routine of steps S10–S13.

According to the first embodiment, rear lens group 1d moved to the reference position at power on is transferred to position K calculated on the basis of distance information C indicating the position of rear lens group 1d when power was turned off and position Z of zoom lens group when power is turned on.

Figure 3:
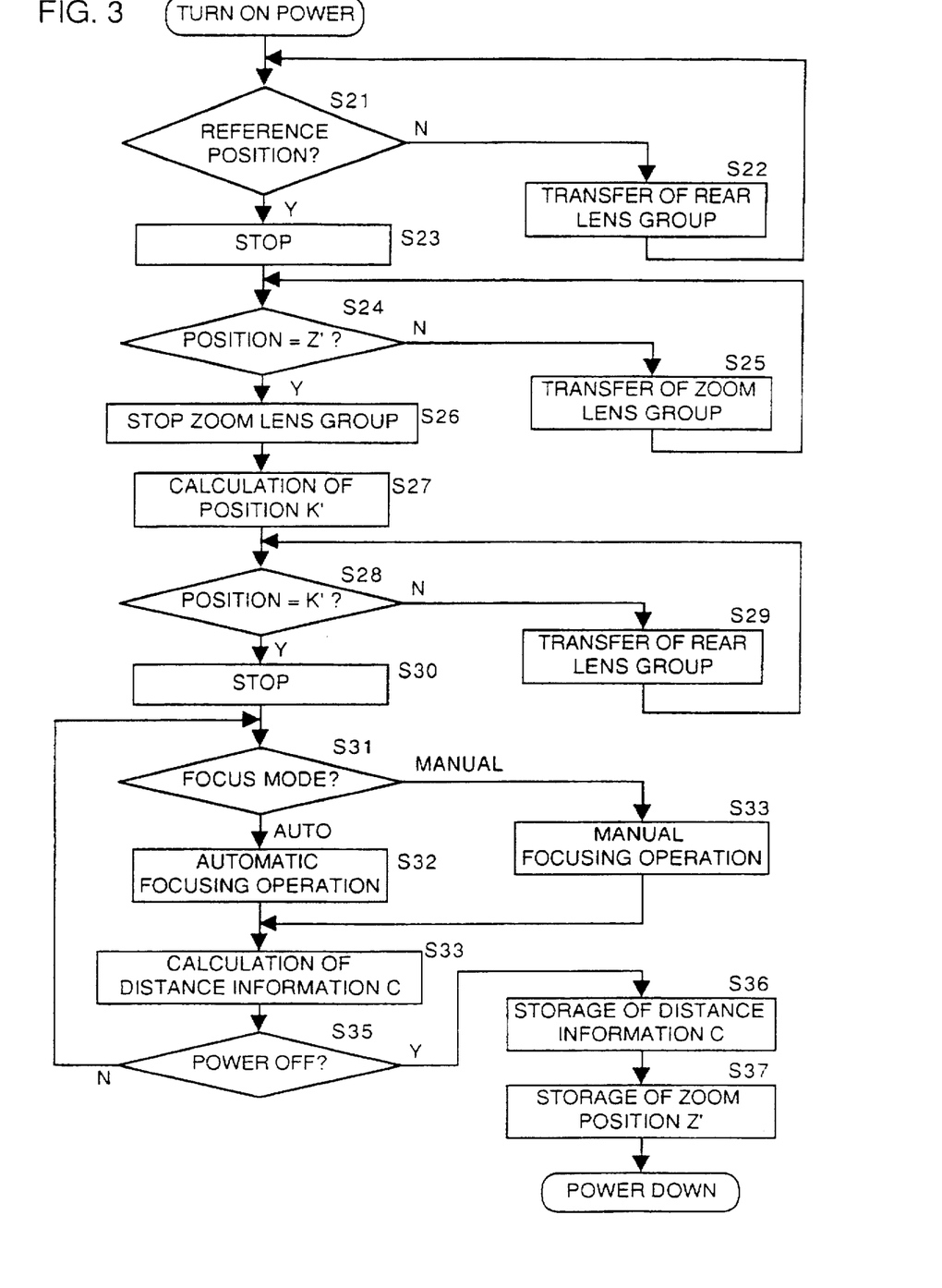

An operation of the video camera of FIG. 1 according to a second embodiment will be described with reference to the flow chart of FIG. 3.

In contrast to the first embodiment, a position Z' of zoom lens group 1b detected using encoder 8 is stored in memory 16 at the time power is turned off. Zoom lens group 1b is restored to the position stored in memory 16 when turned on again. Therefore, zoom lens group 1b and rear lens 1d are both restored to their previous position when power was turned off.

Power supply switch 17 is operated, whereby power is supplied to each component of the video camera by power supply circuit 18. Reference position sensor 12 detects whether rear lens group 1d is located at the reference position specified by reference position sensor 12 (S21). If rear lens 1d is not located at the reference position, rear lens 1d is moved towards the reference position by pulse motor 11 (S22) to be placed at the reference position (S23). Detection is made using encoder 8 whether zoom lens group 1b is currently located at position Z' stored at the time power was turned off (S24). When zoom lens group 1b is not located at position Z', zoom lens 1b is moved thereto by zoom motor 7 (S25) to be located at that position (S26). Then, position K' of rear lens group 1d focusing on a subject when power was last turned off is calculated (S27) using the following equation (3) with respect to the position of the moved zoom lens group 1b where a' is the position of rear lens group 1d focusing on a subject at a near point on the basis of the reference position, b' is the position of rear lens group 1d focusing on a subject at an infinity point on the basis of the reference position, and C as the distance information stored in memory 16 beforehand.

$$K' = C \cdot (a'-b') + b' \quad (3)$$

Then, rear lens group 1d is moved towards position K' by pulse motor 11 to be placed at position K' (S28, S29, S30).

The control proceeds to S31 where determination is made whether focus mode switch 14 is set to an autofocus mode or a manual focus mode. When auto focus mode is specified, pulse motor 11 is controlled to carry out an auto focusing operation according to a focus information signal from autofocus circuit 6 (S32). When in manual focus mode, pulse motor 11 is controlled by operation of manual focus switch 15 to carry out a manual focusing operation by moving rear lens group 1d along the direction of the optical axis (S33). This distance information C is calculated using equation (1) according to the current position of zoom lens group 1b and rear lens group 1d (S34). Similar to the first embodiment, distance information C is used to control the transfer of rear lens group 1d while maintaining the relationship of the position of the zoom lens group and the rear lens group shown in FIGS. 4 and 5 in response to the transfer of zoom lens group 1b by an operation of zoom switch 13 in the focusing operation of steps S32 and S33.

When power supply switch 17 is operated to specify power OFF (S35), distance information C is stored in memory (S36). The position of zoom lens group 1b detected by encoder 8 is stored in memory 16 (S37). The supply of power to each component by power supply circuit 18 is cut, whereby the series of process is completed. It is to be noted that the stored contents will not be erased even when the power is turned off since memory 16 is nonvolatile. If power OFF is not specified at step S35, the control returns to step S31 to repeat the process routine of steps S31–S35.

According to the second embodiment, zoom lens group 1b is moved to position Z' stored at the time of power off when power is turned on, and rear lens group 1d moved to the reference position when power is turned on is transferred to position K' calculated on the basis of distance information C indicating the position of the rear lens group stored at the time of power off and position Z' of zoom lens group 1b.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera apparatus including a rear focus system lens unit having a zoom lens group and a rear lens group for carrying out a focusing operation by moving said rear lens group, comprising:

memory means for storing a relative value as the position of said rear lens group when power is turned off on the basis of the position of said rear lens group focusing on a subject at a near point and the position of said rear lens group focusing on a subject at an infinity point with respect to said zoom lens group located at a position identical to a position of said zoom lens group when power was turned off, wherein said relative value is a ratio of: (a) a distance (Y') between an actual position of said rear lens group and another position of said rear lens group focusing on a subject at an infinity point to (b) another distance (Y) between yet another position of said rear lens group focusing on said subject at a near point and said another position of said rear lens group focusing on said subject at an infinity point, first transfer means for transferring said rear lens group to a reference position when power is turned on, position detection means for detecting the position of said zoom lens group, and second transfer means for transferring said rear lens group to a position calculated on the basis of the position of said zoom lens group detected by said position detection means and said relative values stored in said memory means.

2. The camera apparatus according to claim 1, wherein said relative value C stored in said memory means is calculated by an equation of:

$$C=(P-B)/(A-B)$$

where A and B are the positions of said rear lens group focusing on a subject at a near point and at an infinity point, respectively, when said zoom lens group is located at a position identical to that when power was turned off, and P is the actual position of said rear lens group.

3. The camera apparatus according to claim 2, further comprising an ROM table for storing in advance data relating to the position of said rear lens group focusing on a subject at a near point and at a infinity point at each position of said zoom lens group.

4. The camera apparatus according to claim 2, wherein said second transfer means transfers said rear lens group to a position K calculated by an equation of:

$$K=C\times(a-b)+b$$

where a and b are the positions of said rear lens group focusing on a subject at a near point and an infinity point, respectively, with respect to the position of said zoom lens group detected by said position detection means, and C is the relative value stored in said memory means.

5. The camera apparatus according to claim 1, further comprising focusing means to move said rear lens group for carrying out a focusing operation after transfer of said rear lens group by said second transfer means is completed, and calculation means for calculating said relative value to be stored in said memory means after a focusing operation by said focusing means ends.

6. The camera apparatus according to claim 5, further comprising power supply detection means for detecting turn off of power of said apparatus, wherein said memory means stores said relative value calculated by said calculation means when an instruction is detected to turn off power of said apparatus by said power supply detection means.

7. The camera apparatus according to claim 6, wherein said memory means comprises a nonvolatile memory.

8. The camera apparatus according to claim 5, wherein said focusing means comprises autofocusing means for carrying out a focusing operation automatically.

9. The camera apparatus according to claim 5, wherein said focusing means comprises manual focusing means for carrying out a focusing operation manually.

10. The camera apparatus according to claim 1, wherein said first transfer means comprises a pulse motor operating in response to a predetermined drive pulse, and a reference position sensor for providing a predetermined detection signal when said rear lens group is located at said reference position.

11. A camera apparatus including a rear focus system lens unit having a zoom lens group and a rear lens group for carrying out a focusing operation by moving said rear lens group, comprising:

first memory means for storing a position of said zoom lens group at the time power is turned off, second memory means for storing a relative value as the position of said rear lens group when power is turned off on the basis of the position of said rear lens group focusing on a subject at a near point and the position of said rear lens group focusing on a subject at an infinity point with respect to said zoom lens group located at a position identical to a position of said zoom lens group when power was turned off, wherein said relative value is a ratio of: (a) a distance (Y') between an actual position of said rear lens group and another position of said rear lens group focusing on a subject at an infinity point to (b) another distance (Y) between yet another position of said rear lens group focusing on said subject at a near point and said another position of said rear lens group focusing on said subject at an infinity point, first transfer means for transferring said rear lens group to a reference position when power is turned on, second transfer means for transferring said zoom lens group to a position stored in said first memory means when power is turned on, and third transfer means for transferring said rear lens group to a position calculated on the basis of the position of said zoom lens group transferred by said second transfer means and said relative value stored in said second memory means after movement of said rear lens group is completed by said first transfer means.

12. The camera apparatus according to claim 11, wherein said relative value C stored in said second memory means is calculated by an equation of:

$$C=(P-B)/(A-B)$$

where A and B are the positions of said rear lens group focusing on a subject at a near point and an infinity point, respectively, when said zoom lens group is located at a position of power off, and P is the actual position of said rear lens group.

13. The camera apparatus according to claim 12, further comprising an ROM table for storing beforehand data concerning positions of said rear lens group focusing on a subject at a near point and at an infinity point at various positions of said zoom lens group.

14. The camera apparatus according to claim 12, wherein said third transfer means transfers said rear lens group to a position K calculated by the equation of:

$$K = C \cdot (a-b) + b$$

where a and b are positions of said rear lens group focusing on a subject at a near point and an infinity point, respectively, with respect to the position of said zoom lens group transferred by said second transfer means, and C is the relative value stored in said second memory means.

15. The camera apparatus according to claim 11, further comprising:

focusing means to move said rear lens group for carrying out a focusing operation after movement of said rear lens group by said third transfer means is completed, and calculation means for calculating said relative value to be stored in said second memory means after a focusing operation by said focusing means ends.

16. The camera apparatus according to claim 15, further comprising power supply detection means for detecting instruction of turning off power supply of said apparatus, wherein said first and second memory means stores said relative value calculated by said calculation means and the position of said zoom lens group when instruction of turning off the power supply of said apparatus is detected by said power supply detection means.

17. The camera apparatus according to claim 16, wherein said first and second memory means comprise a nonvolatile memory.

18. The camera apparatus according to claim 15, wherein said focusing means comprises automatic focusing means for carrying out a focusing operation automatically.

19. The camera apparatus according to claim 15, wherein said focusing means comprises manual focusing means for carrying out a focusing operation manually.

20. The camera apparatus according to claim 11, wherein said first transfer means comprises a pulse motor operative in response to a predetermined drive pulse, and a reference position sensor for providing a predetermined detection signal when said rear lens group is located at said reference position.

* * * * *